Patented Oct. 4, 1949

2,483,571

UNITED STATES PATENT OFFICE 2,483,571

REACTION OF ORGANIC SUBSTANCES WITH PHOSPHOROUS SESQUISULFIDE

Elmer W. Brennan and Norman D. Williams, Chicago, Ill., assignors to The Pure Oil Company, Chicago, Ill., a corporation of Ohio No Drawing. Application December 20, 1945, Serial No. 636,286

6 Claims. (Cl. 260—399)

This invention relates to the reaction of organic substances with phosphorus sesquisulfide, and is more particularly concerned with the method of preparing additives for lubricating oils.

Lubricant additives prepared by the reaction of phosphorus sulfides with alcohols, esters and olefinic hydrocarbons are known in the art as disclosed by patents to Loane et al., Patent 2,316,088; Smith et al., Patent 2,342,432 and Prutton, Patent 2,242,260.

An object of the invention is to provide an improved method for reacting phosphorus sesquisulfide with organic compounds and substances.

Another object of this invention is to provide an improved method for making lubricant additives by reaction of phosphorus sesquisulfide with organic compounds.

Still another object of the invention is to provide an improved method for reacting phosphorus sesquisulfide with alcohols, organic acid esters and salts, organic acids and olefinic hydrocarbons.

Still another object of the invention is to prepare improved lubricant additives by the reaction of phosphorus sesquisulfide with organic acid esters and salts, alcohols, organic acids and olefinic hydrocarbons.

Other objects of the invention will appear from the following description.

We have discovered that the reaction between phosphorus sesquisulfide and various organic compounds, such as esters, salts of acids containing an unsaturated linkage, alcohols and olefinic hydrocarbons is promoted by the presence of oxygen and that the more intimate the contact between the oxygen and the substances undergoing reaction, the more effective is the oxygen in promoting the reaction. In accordance with our invention oxygen, air or other free oxygen-containing gas is blown, bubbled through or otherwise intimately contacted with a mixture of the organic substance or compound and phosphorus sesquisulfide at elevated temperature, at such rate as to maintain the reaction mixture at the desired reaction temperature. The reaction of the phosphorus sesquisulfide with an organic compound such as an alcohol, ester or olefinic hydrocarbon is exothermic in the presence of free oxygen. If the reaction mixture is heated to a temperature at which the reaction proceeds in the presence of oxygen the reaction mixture can be maintained at the desired reaction level by controlling the rate at which air is blown through the mixture without the necessity of further heating of the mixture. Moreover, the completion of the reaction can readily be determined by drop in the reaction temperature or by failure of the temperature to increase upon increasing the rate of air blowing; or by the cessation of fuming. If the reaction is complete, a test sample taken from the reaction mixture and chilled down to 32° F. should leave no precipitate of phosphorus sesquisulfide when the product is examined at room temperature or, in the case of products which are solid at room temperature, when examined at their melting point. In the event the reaction mixture contains phosphorus sesquisulfide in excess of the amount which will react, the chilling test is not applicable to determine completion of the reaction.

In order to prepare oleaginous lubricant additives or compositions suitable for use in the preparation of lubricant additives in accordance with our invention, an olefin, unsaturated ester, alcohol, or material containing such substances is mixed with the required amount of phosphorus sesquisulfide and heated with constant agitation to a temperature such that upon blowing air therethrough the desired reaction temperature will be maintained without further addition of extraneous heat. We have found that a temperature of approximately 215° to 250° F. and preferably about 240° to 250° F. will enable the temperature of the mixture to be maintained at reaction temperature by air blowing alone. The rate at which air or other oxygen-containing gas is blown through the mixture will depend upon the volume of the mixture undergoing reaction, the nature of the organic substance undergoing reaction, the relative quantities of phosphorus sesquisulfide and other reactant present in the mixture, and the concentration of oxygen in the gas. We prefer to blow air or oxygen-containing gas through the mixture at such rate as to maintain the reaction temperature at approximately 240° to 250° F. Temperatures up to 300° F. or higher may be maintained, but it is more difficult to obtain uniform products at higher temperatures and high losses of sulfur and phosphorus result. After reaction between the organic substance and phosphorus sesquisulfide is substantially completed at temperatures not substantially above 250° F. the reaction product may be heated to temperatures up to 300° F. for a short time without injurious results.

The invention is particularly applicable to the preparation of reaction products of phosphorus sesquisulfide and olefinic hydrocarbons, preferably those having at least 8 carbon atoms in the molecule, such as diisobutylene, cetene, octadecene, cerotene and melene; to the preparation of reaction products of phosphorus sesquisulfide and alcohols, both aromatic and aliphatic, preferably those having at least 8 carbon atoms in the molecule, such as octyl, cetyl, lauryl, oleyl and phenyl octyl alcohols, and particularly those having branched chains; and to the preparation of reaction products of phosphorus sesquisulfide and unsaturated salts or esters, preferably esters of fatty acids having at least 8 carbon atoms in the molecule such as barium and zinc oleates, glycerol oleate and cetyl oleate; and to the preparation of reaction products of phosphorus sesquisulfide and unsaturated fatty acids, as for example, oleic acid, linoleic and linolenic acids. In general, the invention is applicable to the various alcohols, esters and olefins disclosed in the aforementioned patents to Loane et al., Smith et al. and Prutton.

As previously pointed out, instead of using pure compounds oleaginous substances containing olefins or mixtures thereof, alcohols or mixtures thereof, or esters or mixtures thereof, may be used, as for example an olefinic polymer containing a mixture of various olefins, a mixture of octyl alcohol isomers, or a fatty oil or wax, such as wool grease and sperm oil.

The use of air blowing during reaction not only materially shortens the reaction period, but accomplishes a more complete reaction of the reactants, thereby minimizing the possibility of free phosphorus sesquisulfide being present in the final product, and produces a product having better odor and physical appearance. The use of air or other free oxygen-containing gas furthermore permits of better control of the reaction.

Phosphorus sesquisulfide may be reacted with the various organic substances before mentioned in widely varying amounts. In the preparation of lubricating oil additives we prefer to use an amount of phosphorus sesquisulfide equivalent to 1.5 to 12% by weight of phosphorus, based on the organic substance reacted with it.

In order to demonstrate the invention, sperm oil having the following characteristics—

| | |
|---|---|
| Saponification number | 136 |
| Acid number | 0.21 |
| Iodine number | 78.9 |
| Ash | Trace |
| Solidification point °C | −2.0 |
| Vis. @ 100° F. S. U. S. | 97.2 |
| Acetyl value | 7.0 |
| Per cent water | Trace |
| A. P. I. gravity | 29.3 |
| Specific gravity | 0.8800 | was reacted with 6.8% of commercial phosphorus sesquisulfide by heating the mixture with constant agitation to approximately 230° F. and then blowing air through the heated mixture while continuing the agitation but discontinuing the heating. Air was blown through at such rate as to maintain temperature of the mixture undergoing reaction at 240° to 250° F. In this example, the total weight of reactants was 3000 grams, and the amount of air introduced into the mixture averaged approximately 45 cubic feet per hour. Profuse fuming occurred during the course of the reaction. After the phosphorus sesquisulfide was completely reacted fuming ceased and the temperature dropped. Complete reaction was obtained in one hour. The resulting product contained 1.94% sulfur and 2.17% of phosphorus by weight. The resulting product was diluted with 200 parts of solvent refined Mid-Continent neutral having a viscosity of 200 seconds Saybolt at 100° F., and neutralized with barium hydroxide octahydrate at 250°–260° F. with good agitation to prepare the barium salt.

Zinc and calcium salts were prepared by saponification with zinc oxide and calcium hydroxide in the same manner as disclosed for barium hydroxide. The resulting salts had the following analyses and properties:

*Table I*

| Salt | Per cent Metal | Per cent S | Per cent P | Mineral Oil Solubility (0.2 W % Metal) |
|---|---|---|---|---|
| Barium | 2.82 | 0.70 | 0.64 | Good. |
| Zinc | 1.50 | 0.66 | 0.67 | Do. |
| Calcium | 0.68 | 0.69 | 0.53 | Do. |

Blends of the three salts prepared as aforesaid were made with Pennsylvania neutral having a viscosity of 180 seconds Saybolt at 100° F. so that the finished blend contained 0.2% by weight of metal.

Wool grease was reacted with phosphorus sesquisulfide in the same amounts and under the same conditions just described in connection with sperm oil. The wool grease-phosphorus sesquisulfide reaction product was also made in the conventional manner described in Example 1 of Patent 2,375,060. These products were saponified with barium hydroxide octahydrate in the same manner described in connection with sperm oil-phosphorus sesquisulfide reaction product and blended with Pennsylvania neutral so that the blend contained 0.2% by weight of barium. Table II shows a comparison between the wool grease-phosphorus sesquisulfide product made in the conventional manner, and that made with air blowing:

*Table II*

| | Reaction Time | Wt. Per Cent Sulphur in Reaction Product | Wt. Per Cent P in Reaction Product | Odor | Solubility of 1% by Wt. in Mineral Oil |
|---|---|---|---|---|---|
| Without air blowing | 8 hr | 1.60 | 2.20 | Unpleasant | Poor. |
| With air blowing | 55 min | 1.46 | 2.20 | Neutral | Fair. |

These blends were tested in a Lauson engine and gave the following results:

*Table III*

| Additive | Per cent Metal | Koda-chrome Rating | Piston Underside | Varnish Rating | Per cent Brg. Loss |
|---|---|---|---|---|---|
| Blank | | 0 | 1 | 2.2 | 0.62 |
| Ba salt of $P_4S_3$-sperm oil | 0.2 | 2 | 4 | 4.5 | 0.14 |
| Zn salt of $P_4S_3$-sperm oil | 0.2 | 0 | 1 | 1.8 | 0.09 |
| Ba salt of conventional $P_4S_3$ wool grease | 0.2 | 2 | 1 | 2.2 | 0.45 |
| Ba salt of air-blown $P_4S_3$ wool grease | 0.2 | 1.5 | 2 | 2.8 | 0.79 |

Blends of the salts of the phosphorus sequisulfide-sperm oil reaction product with a Mid-Continent (SAE-10) oil were made and subjected to the standard Chevrolet engine test. The Mid-Continent oil used was a solvent refined oil demonstrating high bearing corrosion and low engine cleanliness. Blends containing the additives in amounts equivalent to 0.2% by weight of metal present in the blend showed greatly superior results to the oil without additive, both as to bearing loss and as to engine cleanliness.

In order to further illustrate the invention a mixture of 450 grams of octyl alcohol and 50 grams of phosphorus sequisulfide were heated to refluxing temperature in a 3-neck flask equipped with a vertical condenser. After heating for several hours no reaction had taken place. The procedure was then repeated with bubbling of air through the reaction mixture at a rate of approximately 10 cubic feet per hour. With this rate of air blowing the reaction proceeded without further addition of heat. In this work a mixture of octyl alcohol isomers was used. The resulting product (octyl phosphorus acids) can be saponified with a metallic oxide or hydroxide to give a metal salt. For example, barium hydroxide octahydrate reacts readily with the reaction products to give a barium salt which is oil soluble. Blends of the octyl alcohol-phosphorus sequisulfide reaction product with Mid-Continent solvent refined (SAE-30) lubricating oil were made and subjected to Underwood tests as described in an article entitled "Automotive bearing materials and their application," by A. F. Underwood, Journal of Society of Automotive Engineers, vol. 43, pages 385 to 392, September, 1938. The results are recorded in Table IV:

As a further illustration of our invention 2000 grams of cetyl alcohol were heated with 17% of commercial phosphorus sesquisulfide to a temperature of 230° F. with good agitation. Air was then passed into the mixture at a rate of approximately 45 cubic feet per hour to maintain the temperature at 240°–250° F. for 5 hours without further addition of heat. The reaction product was oil soluble. The barium, calcium and zinc salts of the resulting product can be prepared by double decomposition.

The reaction product of cetyl alcohol and phosphorus sesquisulfide (cetyl thiophosphorus acids) was blended with a Pennsylvania Grade (SAE-30) lubricating oil and tested in a Lauson engine. The results of the tests are tabulated in Table V:

*Table V*

| Percent Additive | Koda-chrome Rating | Varnish | Ring | Percent Brg. Loss |
|---|---|---|---|---|
| Blank | 2.4 | 4− | 1.5 | 0.45 |
| 0.5 | 4.0 | 4+ | 1.8 | 0.25 |
| 1.0 | 2.9 | 3+ | 1.5 | 0.10 |
| 1.5 | 2.5 | 3+ | 1.5 | 0.08 |

From the table it will be seen that the additive when present in the oil in the amount of 0.5% by weight gave the best result as to engine cleanliness, and when present in the amount of 1.5% by weight gave the best result as to bearing loss.

Blends of the cetyl alcohol-phosphorus sequisulfide reaction product made as just described, with Mid-Continent (SAE-30) lubricating oil, were made and the blends were subjected to the Underwood corrosion test. The results of the tests are tabulated in Table IV.

In order to further demonstrate the invention 200 grams of octadecene were reacted with 10% by weight of commercial phosphorus sesquisulfide by heating the mixture to 230° F. and then blowing air through the mixture at a rate of approximately 4 to 5 cubic feet per hour in order to maintain the temperature at 240°–250° F. without further heating for a period of 7½ hours, with good agitation. The resulting product was a liquid with a light yellow cast containing 4.32% of phosphorus and 3.75% of sulfur. The resulting product was blended in the amount of 0.5% by weight with Mid-Continent solvent refined (SAE-30) lubricating oil and evaluated in the

*Table IV*

| Additive | Wt. Per Cent of Additive in Oil | Bearing Loss in Grams | | | | Per Cent Increase in Viscosity | Acid No. | |
|---|---|---|---|---|---|---|---|---|
| | | Cu-Pb | | Ag-Cd | | | New Oil | After 10 hrs. |
| | | 5 hr. | 10 hr. | 5 hr. | 10 hr. | | | |
| Cetyl alcohol+17 wt. per cent $P_4S_3$ | 0.10 | 0.0215 | 0.2016 | 0.0017 | 0.0102 | 48.8 | 0.09 | 3.16 |
| Do | 0.25 | 0.0136 | 0.1114 | 0.0041 | 0.0361 | 34.4 | 0.09 | 1.99 |
| Do | 0.50 | 0.0294 | 0.0983 | 0.0001 | 0.0020 | 17.6 | 0.37 | 2.50 |
| Do | 1.00 | 0.0210 | 0.0800 | 0.0020 | 0.0019 | 5.8 | 0.07 | 0.86 |
| Octyl alcohol+wt. per cent $P_4S_3$ | 0.10 | 0.0427 | 0.0485 | 0.0013 | 0.0164 | 34.5 | 0.18 | 1.32 |
| Do | 0.25 | +0.0090 | +0.0046 | +0.0037 | +0.0023 | 26.6 | 0.24 | |
| Do | 0.50 | +0.0114 | +0.0075 | +0.0331 | +0.0328 | 22.6 | 1.31 | 1.78 |
| Octadecene+wt. per cent $P_4S_3$ | 0.50 | 0.0050 | 0.0080 | 0.0006 | 0.0008 | 3.8 | 0.15 | 0.26 |
| Blank | | 0.0656 | 0.1485 | 0.7298 | 1.4206 | 360 | 0.09 | 5.00 |

Underwood test. The results are tabulated in Table IV.

From an examination of Table IV it will be seen that the reaction product of cetyl alcohol, octyl alcohol and octadecene with phosphorus sesquisulfide all inhibit the bearing corrosion of the Mid-Continent solvent refined (SAE-30) lubricating oil, and that they all materially inhibit polymerization and oxidation of the oil as shown by the per cent increase in viscosity and by acid number after running the oil in the machine. The reaction product of octadecene and phosphorus sesquisulfide was outstanding both as a bearing corrosion inhibitor and in its ability to prevent increase in viscosity of the oil.

In order to determine the relative merits of products made by reacting an organic substance with phosphorus sesquisulfide with and without air blowing, products were prepared in accordance with the following three examples:

Example 1, 1900 parts by weight of wool grease having the following properties—saponification No. 100 to 115; iodine No. 41 to 46; acetyl value 29 to 41, was heated to a temperature of approximately 160° F. and 100 parts by weight of commercial grade phosphorus sesquisulfide, $P_4S_3$, slowly added with continuous agitation. The temperature was gradually increased to 220 to 230° F. and maintained at this temperature until a satisfactory copper strip corrosion test was obtained. This required a period of six hours. The phosphorized wool grease was filtered to remove small amounts of solid impurities and upon analysis the filtered material was found to contain 1.68% sulfur and 2.3% phosphorus. One part by weight of the phosphorized wool grease was mixed with 2 parts by weight of 180 viscosity at 100 Pennsylvania neutral oil and the mixture brought to a temperature of 225 to 235° F. 0.185 part by weight of crystalline barium hydroxide $Ba(OH)_2.8H_2O$, was slowly added with continuous agitation. A considerable amount of frothing occurred due to evolution of steam. The mixture was maintained at the aforementioned temperature until all frothing had ceased and heating was continued for approximately ½ hour thereafter to make certain that the saponification reaction had terminated. The time required for reaction of the barium hydroxide was one hour. The saponified product was filtered to remove small amounts of solid by-product materials thereby producing a homogeneous, light brown product. Analysis of the filtered material showed that it contained in combined form, 2.7% barium, 0.55% phosphorus and 0.34% sulfur. The theoretical content of these materials based on the amounts of reactants employed is 2.6% barium, 0.74% phosphorus and 0.54% sulfur. The filtered saponified concentrate was a light colored, slightly viscous liquid having a Saybolt viscosity at 100° F. of 457 seconds.

In Example 2 1500 grams of wool grease and 80 grams of phosphorus sesquisulfide were mixed together and the mixture heated to 230° F. while being constantly stirred. After the reaction mixture had attained a temperature of 230° F. heating was discontinued and air was blown through the mixture at the rate of 45 cubic feet per hour for a period of one hour. The mixture was continuously stirred during the entire time. The rate of air blowing was sufficient to maintain the reaction mixture at 230° F. without application of heat. At the end of the one hour blowing period the reaction was complete, as evidenced by the stoppage of fuming and the failure to obtain a temperature increase with an increase in rate of air flow.

The reaction mixture was then filtered at 230° F. and analyzed for sulfur and phosphorus content. It was found to have a sulfur content of 1.46% by weight and a phosphorus content of 2.23% by weight.

One part of the filtered reaction product was mixed with 2 parts by weight of Mid-Continent neutral having a Saybolt viscosity of 200 at 100° F., and with barium hydroxide $(Ba(OH)_2.8H_2O)$ in an amount equal to .09 part by weight of barium. The mixture was slowly heated to a temperature of 225 to 235° F. with continuous agitation in order to saponify the reaction product in the same manner as described in Example 1. After saponification was complete heating was continued at a temperature of approximately 340° F. for a period of 45 minutes in order to insure completion of the saponification reaction and to stabilize the product. The resulting saponified product showed the following analysis:

| | Per cent by weight |
|---|---|
| Barium | 2.62 |
| Sulfur | 0.41 |
| Phosphorus | 0.64 |

Example 3, sperm oil was phosphorized with phosphorus sesquisulfide with air blowing in the same manner as described with reference to wool grease in Example 2. Separate portions of the phosphorized sperm oil reaction product were saponified with zinc oxide and barium hydroxide in the manner heretofore described, so that resulting saponified product contained 2.8% of the metal.

Metal salts prepared in accordance with Examples 1, 2 and 3 were tested in a Lauson engine by adding the metal salt to a Mid-Continent neutral oil having a viscosity of 180° seconds Saybolt at 100° F. in such amount that the metal content of the oil was equivalent to 0.242% by weight of barium. The Lauson engine tests were run under the following conditions:

| | | |
|---|---|---|
| Jacket temperature | °F | 170 |
| Sump temperature | °F | 280 |
| Load | kw | 1.3 to 1.4 |
| R. P. M. | | 1600 |
| Duration of tests | hours | 25 |

The results from this test showed that the barium salts of wool grease-phosphorus sesquisulfide reaction product, and sperm oil-phosphorus sesquisulfide reaction product prepared with air blowing, were as effective as detergents and bearing corrosion inhibitors as the barium salt of the wool grease-phosphorus sesquisulfide reaction product made without air blowing. The zinc-sperm oil-phosphorus sesquisulfide reaction product made in accordance with Example 3 did not give the over-all engine cleanliness of the barium salts, but the bearings showed less corrosion with the zinc salts than with the barium salts.

It is believed that the reaction products of the various esters, alcohols and olefins with phosphorus sesquisulfide are organic thiophosphorus acids which can be esterified or converted into salts.

As previously mentioned, additives prepared by reacting phosphorus sesquisulfide with alcohols, unsaturated esters and olefins in the presence of free oxygen may be used per se as polyfunctional lubricant additives, or they may be converted into metal salts or esterified and used in the form of their salts or esters.

We claim:

1. The method of reacting phosphorus sesquisulfide with an organic material reactable therewith selected from the group consisting of unsaturated esters of fatty acids, salts of unsaturated fatty acids, olefinic hydrocarbons, unsaturated fatty acids, and alcohols, the members of said group each containing at least about 8 carbon atoms, comprising, heating a mixture of said material and phosphorus sesquisulfide to reaction temperature in the range from 215° to 300° F., at which temperature the phosphorus sesquisulfide and the functional group in the organic material combine, and aerating the heated mixture with gas containing free oxygen at a rate which induces an exothermic reaction and maintains the mixture at reaction temperature within the approximate range from about 240° to 300° F. without the application of heat from an external source.

2. The method of preparing a sulfurized-phosphorized lubricating oil additive comprising, heating a mixture of a starting material from the group consisting of unsaturated esters of fatty acids, salts of unsaturated fatty acids, olefinic hydrocarbons, unsaturated fatty acids and alcohols, the members of said group each containing at least about 8 carbon atoms, and an amount of phosphorus sesquisulfide equivalent to about 1.5 to 12.0 per cent by weight of phosphorus based on said starting material to a temperature in the range from about 215° to 250° F., and aerating said mixture with sufficient gas containing free oxygen to induce an exothermic reaction and maintain the reaction temperature within the stated range without the application of heat from an external source.

3. The process in accordance with claim 2 in which the organic starting material comprises, an unsaturated ester of a high molecular weight fatty acid and a monohydroxy alcohol.

4. The process in accordance with claim 2 in which the organic material is sperm oil.

5. The process in accordance with claim 2 in which the organic material is a salt of a fatty acid.

6. The method in accordance with claim 2 in which the organic material is wool grease.

ELMER W. BRENNAN.
NORMAN D. WILLIAMS.

REFERENCES CITED

The following references are of record in the file of this patent:

UNITED STATES PATENTS

| Number | Name | Date |
|---|---|---|
| 2,133,310 | Shuman | Oct. 18, 1938 |
| 2,142,998 | Chittick | Jan. 10, 1939 |
| 2,211,231 | Henderson | Aug. 13, 1940 |
| 2,308,427 | Roehner et al. | Jan. 12, 1943 |
| 2,355,106 | Prutton | Aug. 8, 1944 |
| 2,382,121 | Whittier | Aug. 14, 1945 |